United States Patent [19]

Blair

[11] 4,183,883

[45] Jan. 15, 1980

[54] METHOD OF ROTATIONAL MOLDING ABOUT PLURAL AXES AT LOW ROTATIONAL SPEEDS

[75] Inventor: Edgar A. Blair, Cranbury, N.J.

[73] Assignee: Monster Molding, Ltd., Brooklyn, N.Y.

[21] Appl. No.: 902,365

[22] Filed: May 3, 1978

Related U.S. Application Data

[60] Division of Ser. No. 471,124, May 17, 1974, Pat. No. 4,104,357, which is a continuation-in-part of Ser. No. 322,457, Jan. 10, 1973, abandoned, which is a continuation of Ser. No. 105,099, Jan. 8, 1971, abandoned.

[51] Int. Cl.$^2$ .......................... B29C 5/04; B29C 5/08; B29D 3/02
[52] U.S. Cl. .................................. 264/40.1; 264/255; 264/257; 264/271; 264/310
[58] Field of Search .............. 264/310, 250, 255, 259, 264/271, 45.7, 240, 241, 257, 40.1

[56] References Cited

U.S. PATENT DOCUMENTS

| | | | |
|---|---|---|---|
| 1,998,897 | 4/1935 | Kay | 264/503 |
| 3,217,078 | 11/1965 | Kleiber | 264/310 |
| 3,222,439 | 12/1965 | Bolomey et al. | 264/312 |
| 3,337,662 | 8/1967 | Spencer | 264/310 |
| 3,347,371 | 10/1967 | Verbaere | 209/172 |
| 3,347,971 | 10/1967 | Mankowich et al. | 264/310 |
| 3,410,934 | 11/1968 | Kuritzkes et al. | 264/310 |
| 3,414,456 | 12/1968 | Roberts | 264/255 |
| 3,420,729 | 1/1969 | Roberts | 264/310 |
| 3,427,689 | 2/1969 | Windecker | 264/337 |
| 3,507,950 | 4/1970 | Barnett et al. | 264/310 |
| 3,539,659 | 11/1970 | De Hoff | 260/834 |
| 3,551,551 | 12/1970 | Hugi | 264/310 |
| 3,629,206 | 12/1971 | Stephenson et al. | 528/375 |
| 3,683,062 | 8/1972 | Von der Heide | 264/310 |
| 3,694,530 | 9/1972 | Wolfe | 264/338 |

FOREIGN PATENT DOCUMENTS

1136166 12/1968 United Kingdom .

OTHER PUBLICATIONS

Anon. "Vinyl Organosol and Plastisol Dispersions", Modern Plastics, vol. 26, p. 78, (Apr. 1949).

*Primary Examiner*—W. E. Hoag

[57] ABSTRACT

Low speed rotational molding of plastic objects at about ambient temperatures from a liquid thermosetting plastic material distributed in a mold substantially under gravitational force; the selected thermosetting plastic is placed as a distributable liquid in a mold having a volume much larger than the volume of the liquid polymer and slowly rotated about two axes at or about room temperature; urethane polymers to which a quantity of diamine curing agent has been added prior to the introduction of the flowable plastic into the rotatable mold are typical thermosetting materials; useful objects or shapes having thin, relatively uniform walls are produced by the disclosed process; repetition of molding steps allows the build up of same or different layers which may have interposed therebetween, lightening, stiffening, and/or strengthening members; precoating of a mold with a variety of coatings which release, interact, or decorate the thermoset resin surface is also disclosed.

6 Claims, 1 Drawing Figure

U.S. Patent     Jan. 15, 1980     4,183,883
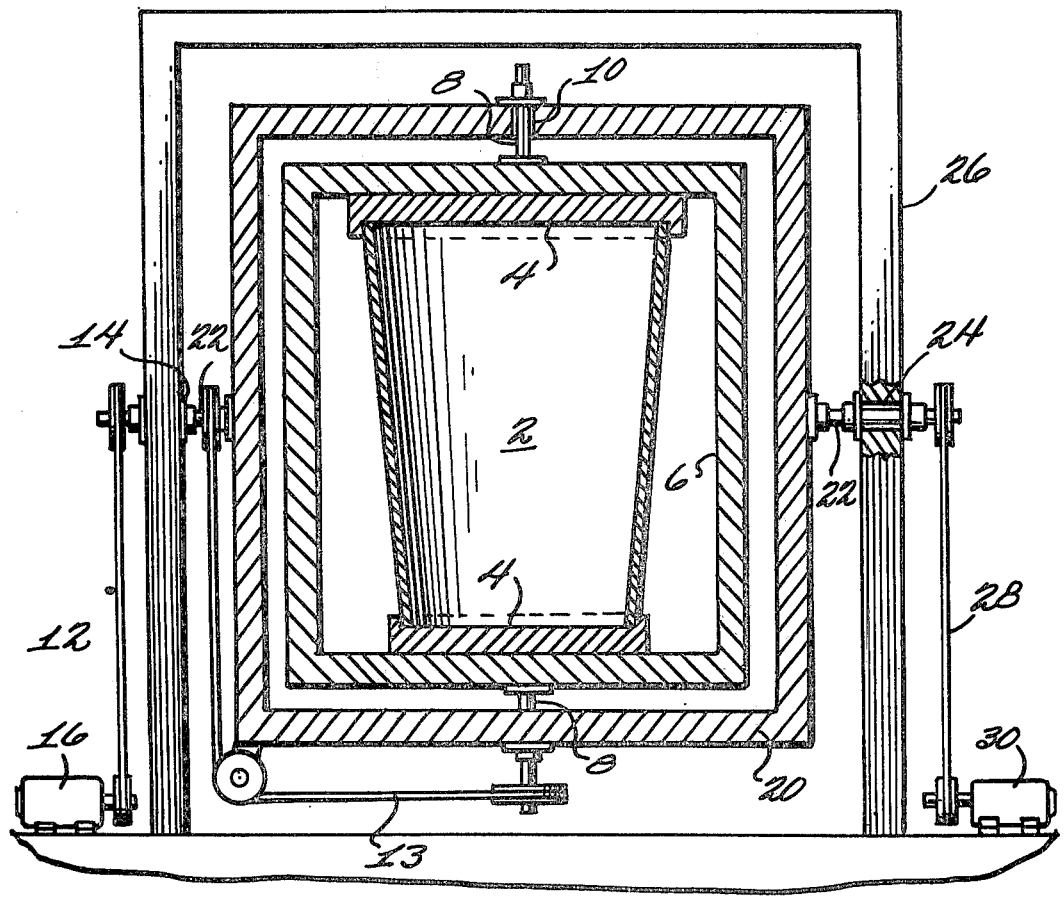

METHOD OF ROTATIONAL MOLDING ABOUT PLURAL AXES AT LOW ROTATIONAL SPEEDS

CROSS REFERENCE TO RELATED APPLICATIONS

This is a divisional application of Ser. No. 471,124 filed May 17, 1974 now U.S. Pat. No. 4,104,357, which is a continuation-in-part of application Ser. No. 322,457 filed Jan. 10, 1973, now abandoned, and which was also a continuation-in-part of application Ser. No. 105,099 filed Jan. 8, 1971, also now abandoned.

This invention pertains to low speed rotational molding of thermoset plastics to produce an article having relatively thin walls. More particularly, this invention pertains to shaping, in a slowly, multi-axially, rotating mold, of articles under substantial gravitational force influence. By practicing the present process, large, medium, or small shapes or articles are obtained at low unit cost, e.g., based on capital costs. The advantages obtainable are especially notable when shaping large articles.

BACKGROUND OF THE INVENTION

Small articles such as dolls, balls, shoes, and the like have been molded from liquid polymer systems including rubber and vinyl resins. For example, U.S. Pat. No. 1,998,897, granted in 1935 discloses a "rotational casting" method of manufacturing hollow articles from a heat-sensitive latex. In this method, a measured charge of the heat sensitive latex is deposited in a closed mold which is then rotated in a plurality of planes and as the mold rotates, the latex flows and coats the inner surfaces of the mold. Simultaneously with the rotation of the mold heat generally from 300° F. to 400° F. and even higher is applied in order to get the latex in the form of a thin skin on the inner walls of the mold. The gelled product is then removed from the mold.

Later approaches suggested in Modern Plastics, Volumn 26, page 28, of April, 1949, discuss rotationally casting a plastisol by depositing a measured charge of plastisol into a closed mold and rotating the mold in a plurality of planes. While the plastisol is heated, e.g., up to 400° and even higher using internal means to flux it, it forms a thin skin over the inner wall of the mold. Later the source of heat is removed, the mold is cooled, and the article removed.

Another approach to the manufacture of hollow articles using a plasticized thermoplastic resin is disclosed in U.S. Pat. No. 3,347,371. According to this process, a thermoplastic resin together with a plasticizer and optionally other materials are preblended in a mixer into particles of sufficiently small size so that when introduced into a rotating mold, the material is dry but fluent. A premeasured charge is introduced into the mold and the charged mold is rotated in a plurality of planes and simultaneously heated, e.g., up to 400° F. and even higher, causing the particles contained therein to coalesce and distribute in a relatively even, coalesced layer over the interior surface of the mold in the form of the object to be produced. U.S. Pat. No. 3,420,729 also discloses various compositions suitable for molding as well as heating of a mold while it is being rotated. Similarily, U.S. Pat. No. 3,683,062 discloses heating or cooling of molds at indexed stations as well as rotation in two axes. Various compositions which have been rotationally molded by the prior art methods have been disclosed in U.S. Pat. No. 3,414,456.

Centrifugal casting in which a moving mold rotates about only 1 axis is disclosed in U.S. Pat. Nos. 3,222,439; 3,410,934; and 3,551,551. In these patents the effects of centrifugal force upon the polymer or polymer systems so rotated is a significant factor in producing the result desired and to this end high unidirectional rotational speeds are employed.

In summary, then, the rotational molding of plastics using thermoplastic polymers is already known, wherein a quantity of powdered or liquid thermoplastic material is placed into a closed metal mold and the mold is introduced in an oven maintained at high temperature. While the mold is heated, it is rotated in two dimensions, heating the material and causing the material inside the mold to fuse and coalesce in place. Temperatures of the order of about 450° F. or even higher have been used.

Once the mold walls have been uniformly coated by the heated material, the mold is cooled or the formed article is removed from the oven and allowed to cool. For instance, the mold is set out into the room and allowed to cool to room temperature. When sufficient cooling has occured so that the walls of the object are relatively rigid, the finished part is removed from the mold. The resulting product has relatively thin walls.

It will be readily appreciated that in the process described above, where it is necessary to apply heat to the rotating mold, the rotatable apparatus and molds must withstand the high operational temperatures that are about 450° F. or even higher. This requires equipment of strong, heavy, rigid construction, equipment that requires a substantial investment. Additionally, an adequate period of time is generally required for the mold to cool before the molded object is removed therefrom, thus increasing the time necessary to produce each molded article and tying up expensive equipment.

DETAILED DESCRIPTION OF THE INVENTION

Accordingly, it is an object of the present invention to provide economies in the operation and fabrication of rotational molding equipment, avoiding the necessity for extreme heating that is necessary in normal plastic processing and the requirements to construct the mold and apparatus for turning the same out of materials which have the ability to withstand high temperatures; and to practice a molding process based on a combination of elements producing nonobvious results.

It is also an object of the present invention to avoid the use of strong, rigid, heavy construction equipment of the type customarily used in the processing of plastic materials and to substitute therefor relatively light inexpensive molds.

It has now been further found that through the judicious choice of appropriate resins known as thermoset resin systems, the need for maintaining high temperatures during the course of rotation is eliminated. Since high temperatures are no longer necessary because gelling can take place as the "syrupy" resin is distributed, the investment in equipment is materially reduced in that easily fabricated and relatively inexpensive materials are used for the molds, such as reinforced and unreinforced thermoplastic and thermoset plastics, elastomers, ceramics, paper, and even wood. Internal gas pressurizing of molds is unnecessary and thus the cost of the mold itself is lowered. As the mold may be held at a temperature of no more than 100° C. or need not be heated, an oven or heating means are either very simple, (e.g., simple cover) or need not be employed in conjunction with the molding machine. This too reduces equipment costs and makes the entire molding apparatus less complicated mechanically. With the elimination of the high temperature ovens or heating means, there is virtually no limit on the size of the mold which can be used and the objects produced thereby. Accordingly, the size of the objects produced according to the present invention can be much larger and more economical than articles produced by known procedures.

In my previous applications, Ser. Nos. 105,099 and 322,457, the manner of practicing the invention has been explained without any preference to a theory. However, for a better understanding of this invention and the further particularization of the disclosures, the following may explain the interaction of the elements in the previously described combination.

The interaction of the previously described, heretofore unknown, elements is based on the following discovery. Each thermosetting resin reaches a bulk gel time whichh is a function of a cross-linking, curing, hardening, or setting reaction (these terms are often used interchangeably). However, the above reaction produces heat, i.e., the thermosetting plastics are developed by an exothermic reaction. Consequently, before the thermoset resin reaches a bulk gel time indicated by a rapid increase in viscosity, the viscosity of the thermoset resin goes through a minimum, that is, the initially developed heat of reaction "thins" out the thermoset resin because gelling (i.e., buildup of viscosity by chemical reaction) is much slower than heat induced lowering of viscosity. As a result, from an initially high viscosity stage the resin goes through a minimum and then reaches a very high viscosity stage as the thermoset resin gels upon cross-linking, curing, hardening, or setting until the resin becomes nonviscous, i.e., a solid. Hence, the resins contemplated herein and previously described are nonthixiotropic, i.e., that the rheology of these is predominantly Newtonian. Thus the thermoset resins should be liquid thermoset resins at starting viscosity (in the mold), i.e., of a viscosity lower than 50,000 cps, preferably 15,000 cps—30,000 cps. The slow rotational speeds defined herein are this needed to (a) spread the slowly flowing resin over the inner surface of the mold, (b) distribute the gelling resin over the mold surface as it cures, (c) maintain the resin in a location where it was distributed without accumulation in the mold in a pool due to flowing under gravitational or centrifugal force. The bulk gel time may be defined as being from 3 minutes to 10 minutes according to Society of Plastic Engineering measurement.

From the following formula (Perry's, *Chemical Engineer's Handbook*, 3rd Ed., McGraw-Hill, New York, N.Y. (1950) Page 992), $$F = (W/g)rw^2$$

where F is centrifugal force in grams, W is weight of particle in grams; r is radius of curvature of path in centimeters, w is angular velocity radians/second, and g is acceleration of gravity usually taken as 981 cm/sec$^2$, in the invention herein, the influence of centrifugal force is an undesirable factor. However, in accordance with this invention, the gravational force is a desirable factor.

It is known from the above formula that centrifugal force depends on the radius of the particular mold area and rotation velocity of that area. Any increase of rotational velocity increases the centrifugal force as a square function. Moreover, any increase in centrifugal force is proportional to radius. Hence, from the above, it follows that the spreading and distributing of the resin over the mold surface requires that the centrifugal force in the process described herein is insignificant, i.e., less than 10% of gravitational force, generally less than 2%, preferably less than 1%, because the spreading is achieved by allowing the initially high viscosity resin to flow by gravity over the mold surface and then as it becomes thinner to distribute evenly, again under gravitational influence and by means of rotation inside the mold (not rotationally distributed but by means of gravity as the mold rotates).

The rotation is maintained at low speeds so that the thin "syrupy" thermoset liquid does not accumulate in any portion of the mold, which it would do if centrifugal force were the force having an influence, e.g., in excess of 10% of the gravitational force.

If a mold were used which was heated at a temperature such that the viscosity was very low, e.g., 400 cps, then the resin would either thin out too fast, e.g., slosh around (cohesive failure within polymer liquid) and take a long time to distribute as it gels, or it gels and hardens too fast; or still further, if higher rotation speeds are used, the resin accumulates in a pool. A heated mold would cause great increases in temperature and the acceleration of exothermic reaction. The combination of these would generate great increase in temperature, cause the resin to rapidly thin out, slosh around and at the same time gel and harden within a very short time—all before the resin could be properly distributed. The same rapid hardening would occur if the resin were in a pool as the mold is rotated too fast. Thus, if the resin cures too fast, e.g., $\frac{1}{2}$ to 3 minutes, it is not distributable over the mold surface. Similarly, if the viscosity is too high, e.g., 100,000 centipoises (cps) it cannot be readily distributed under the influence of gravity Consequently, the "in mold" viscosity, the gel time, distribution, etc., play an important role in the combination disclosed herein.

It is for this reason that the invention is confined to the thermoset resins as these display the exothermic resactions and minima in their viscosity versus time curve during the reaction and these resins have been discovered to be gravitationally manipulatable at the very low rotational velocities of the mod within the gel time of these resins.

It has also been discovered that the operating at ambient, e.g., 50° F. to 110° F. and even up to 100° C. (at constant temperature), the mold acts as a heat sink to reduce the effect of the exothermic heat of reaction. The mold thus helps to reduce sufficiently the viscosity drop because the thermoset resin is fairly thin. Consequently, the proper relating and interaction of the variables provide the manifold advantages: low capital costs, low energy requirements, low rotational speed operation, flexible production machinery, easy mold production, etc. F.

FIGURE 1 is a partial cross-sectional view of an apparatus useful for rotating a suitable mold in two axes.

The apparatus shown in the FIGURE is particularly well suited for conducting the process of the invention disclosed herein. In this apparatus a mold 2 is retained in place by mold supports 4 that are secured to an inner frame 6 which is vertically mounted for rotation about a vertical axis as shown in the FIGURE through axis 8 and bearings 10. Inner frame 6 is rotated through a series of belts 12 and connected through slip joint drive shaft 14 to motor 16. Outer frame 20 is mounted on a horizontal axis 22 through bearings 24 and secured to the outer support member 26. The outer frame is rotated about a horizontal axis through pulley and belt linkage 28 connected to outer frame drive motor 30.

According to the apparatus shown in the FIGURE, in operation, the horizontal axis is rotated by outer frame drive motor 30 while the vertical axis rotation is controlled by inner frame drive 16. The speed of rotation of the two axes, e.g., mutually perpendicular axes is mutually independent, being governed by the speed of the two respective drive motors 16 and 30. In this way the relative speed of rotation of the two axes may be conveniently controlled through electrical speed control means (not shown).

According to another embodiment of my invention not illustrated, it is possible to provide a set of planetary gears connecting the horizontal and vertical axis so that the vertical axis will rotate at a predetermined ratio with respect to the horizontal axis and only one drive motor will be required. However, I prefer to use an apparatus of the type shown in which the speed of rotation of two mutually perpendicular axes may be independently controlled.

Thus, according to the process of the present invention, a thermosetting polymer, prepolymer, or polymer system is mixed with a suitable curing agent and placed in a mold. The mold is then rotated at room temperature in two dimensions until the walls of the mold are uniformly coated and the polymer hardens, then removing the formed object from the mold. As used herein, room temperature or ambient temperature designates a temperature in the range of about 50° to 100° F.

The process, briefly stated, comprises the successive steps of mixing a thermosetting polymer or prepolymer with a curing agent and placing the resulting mixture into a mold, rotating the mold at ambient temperatures about two axes conveniently mutually perpendicular axes to cause the mixture to coat the walls of the mold taking the form thereof, continuing the rotation until the mixture hardens and then removing the solid object thus produced from the mold.

In the apparatus of the FIGURE as described, the speed of rotation about the horizontal axis is totally independent from the speed of rotation of the vertical axis and thus is different from equipment in which the speed of rotation of one axis as a function of the speed of rotation of the other axis. Such equipment typically employs a direct gear linkage such that revolution of one axis will provide a set number of rotations of the other axis. My apparatus is not so restricted in operation, so that depending upon the polymer system used for the purpose of spreading, distributing, and maintaining distribution, the speed of rotation of each of the axes may be varied.

The speed of rotation of each of the axes is independently selected to provide sufficient movement of the mold to coat uniformly all the inner surfaces thereof exposed to the liquid polymer. As the shape of the mold is not fixed and may vary in both size and configuration, so too the speed of rotation varies to account for not only the mold size and configuration but also the viscosity and flow rate of the particular polymer system that is selected.

As mentioned before, the rotational speed used in both dimensions should be less then the speed at which the effects of centrifugal force are exerted on the liquid contained in the mold. Thus, in practice the accumulations of polymer liquid in one or more portions of the mold is generally to be avoided and the appropriate range and ratio of rotational speeds can readily be determined by preliminary adjustment (based on distribution) and/or polymer formula modification (based on viscosity, curing rate, and polymer exotherm).

A vast number of polymer systems curable at or about ambient temperature are known and any number of these may be used in the process of my invention. Illustrative, but by no means limiting, materials and systems include a polyurethane cured with a diamine, an epoxy cured with a polyamine and a polyester cured with a peroxide. Other polymers and polymer systems will be apparent. Additional ingredients may be, of course, be incorporated with the polymer, including plasticizers, stabilizers, fire retardants, dyes, fillers, pigments and the like ingredients normally included in resin formulations.

As indicated, a curing cross-linking or setting agent adapted to the particular polymer system selected is normally used. The curing agent may be added to the polymer and thoroughly mixed therewith prior to introduction to the mold, which is preferred, or the curing agent may simply be added to the mold unmixed with the polymers, in which case the mixing occurs in the mold itself as it rotates.

When an epoxide is employed there can be used reaction products of epichlorhydrin with resorcinol, 2,2-bis (4-hydroxyphenyl) propane (also called bisphenol A), tetrachlorobisphenol A, tetrabromobisphenol A, 4,4'-dihydroxybenzophenone, bis(4-hydroxyphenyl)methane, bis(4-hydroxyphenyl)sulfone, 1,1-bis(4-hydroxyphenyl ethane, 1,1-bis (4-hydroxyphenyl) isobutane, 2,2-bis (4-hydroxyphenyl) butane, 2,2-bis (4-hydroxy-2-methylphenyl) propane, 2,2-bis (4-hydroxy-2-t-butylphenyl) propane, 2,2-bis(3-hydroxynaphthyl) pentane, 1,5-di-hydroxynaphthalene, pyrogallol, phloroglucinol, phenol, formaldehyde novolacs having 3, 4 or 5 epoxy groups, 1,4-butanediol, glycerol, polypropylene glycol, e.g., molecular weight 400, 1,1,3-tris (p-hydroxyphenyl) propane, p-aminophenol, propylene glycol, o-cresolformaldehyde novolac having 2,3,4,5, and 6 epoxy groups, trimethylol propane 2,2-bis(4-hydroxycyclohexyl) propane, novolac resins such as those set forth in Salensky U.S. Pat. No. 3,383,433, May 14, 1968. Other epoxide materials which can be used include epoxidcyl polybutadiene, vincyl cyclohexane dioxide, 3,4-epoxycyclohexylmethyl 3,4-epoxycyclohexane carboxylate, 3-(3,4-epoxycyclohexane)-8,9-epoxy-2,4-dioxaspiro[5,5]-undecane, bis (2,3-epoxy-cyclopentyl)ether, bis (3, 4-epoxy-6-methylcyclohexyl-methyl) adipate, diglycidyl isophthalate, diglycidyl phthalate, diglycidyl phenyl glycidyl ether, triglycidyl ether of methyl phloroglycinol, 2,6-(2,3-epoxypropyl) phenylglycidyl ether, diglycidyl ether of bisphenolhexafluoroacetone, diglycidyl ether of 2,2-bis(4-hydroxyphenol) nonodecane, diglycidyl phenyl ether, triglycidyl 4,4-bis(4-hydroxyphenyl) pentanoic acid, triglycidyl ether of trihydroxydiphenyl, tetraglycidoxy bisphenyl, tetraglycidyl ether of bisresorcinol F, tetraglycidyl ether of resorcinol ketone, tetraglycidoxy tetraphenyl ethane, adduct of 2.5 moles of diglycidyl ether of bisphenol A with 1 mole of hydrogenated castor oil, adduct of 2 moles of the diglycidyl ether of bisphenol A with 1 mole of dimerized linoleic acid, di(2-methyl) glycidyl ether of ethylene glycol, 1,3-bis[3-(2,3-epoxypropoxy) propyl] tetramethyl disiloxane, polyepichlorohydrin di(2,3-epoxypropyl) ether, epoxidized soybean oil, polyallyl glycidyl ether, triglycidyl ester of trimerized linoleic acid, diglycidyl ether of chloroendic diol, diglycidyl ether of dioxanediol, diglycidyl ether of endomethylene cyclohexanediol, diglycidyl ester of dimerized linoleic acid, diglycidyl ether of gydrogenated bisphenol A, limonene dioxide, dicyclopentadiene dioxide, 1,2-epoxy-6-(2,3-epoxypropoxy) hexahydro-4,7-methanoindane, Dow DEN 438 (a phenol-formaldehyde novalac epoxidized with epichlorohydrin, epoxy equivalent per/100 grams=0.55–0.57; viscosity at 52° C.=30,000–90,000.

The primary aliphatic amines such as α, polymethylenediamines, polyether diamines, diethylenetriamine, triethylenetetramine, N-aminoethylethanolamine, N,N-dimethylaminopropylamine, menthanediamine, β-aminoethylpiperazine and 1,3-diaminocyclohexane; primary aromatic amines such as m-phenylenediamine, 4,4'-diaminodiphenylmethane and 4,4'-diaminodiphenyl sulfone and secondary amines such as N-methylpiperazine, N-(β-hydroxyethyl) piperazine, piperidine and pyrrolidine are suitable curing agents for the polyurethane-based resins. See also U.S. Pat. Nos. 3,539,659 and 3,383,433.

Also there can be used the epoxy systems set forth in Lee and Neville "Handbook of Epoxy Resins" (1967), pages 4–36 to 4–56 (Appendix 4-1) and pages 4–58 to 4–70 (Appendix 4-2), incorporated by reference herein.

Polyester resins of the unsaturated type are also useful, particularly polymeric ester reaction products of one or more dicarboxylic acids and one or more polyhydric alcohols. Desirably one or more of these reactants shall contain a reactive double bond or ethylenic linkage. Among the dicarboxylic acids which may be used are phthalic, malic, maleic, fumaric, adipic, pimelic, suberic, sebacic, itaconic, citraconic, and succinic acids and their anhydrides. It is essential that some of the dicarboxylic acid component of the polyester resin contain an unsaturated ethylenic linkage. For this reason, maleic and fumaric acids are most desirable. Among the polyhydric alcohols which may be used are ethylene glycol, diethylene glycol and propylene glycol. A mixture of propylene glycol and dipropylene glycol is the most satisfactory polyhydric alcohol. One may use an unsaturated monohydric alcohol in place of part of the polyhydric alcohol. A typical example of such an alcohol is allyl alcohol which produces an allyl ester of the dicarboxylic acid. The polyester resins may be suitably modified of plasticized by the incorporation of alcohols, fatty acids, etc., to modify the chemical and physical characteristics as desired.

A peroxide is used as the curing agent for the polyester resin systems and examples of such materials include methyl ethyl ketone peroxide, dicumyl peroxide, benzoyl peroxide, cumene hydroperoxide, di-(t-butyl peroxide), m-bis (β-t-butylperoxyisopropyl) benzene, methyl isobutyl ketone peroxide, cyclohexanone peroxide, methyl tetra-hydrofurane hydroperoxide, bis (4, chlorobenzoyl) peroxide, phthalyl peroxide, dilauroyl peroxide, t-butyl peracetate, diacetyl peroxide, di (2,4-dichlorobenzoyl) peroxide, dipelargonyl peroxide, 3,5-dihydroxy-3,5-dimethyl-1,1-dioxacyclopentane, t-butyl peroxybenzoate, t-butyl peroxy (2-ethylhexanoate), 0,0-t-butyl 0-isopropyl mono peroxycarbonate, 2,5-dimethyl-2,5-di (benzoylperoxy) hexane, t-butyl peroxy (2-ethylbutyrate), 2,5-dimethyl-2,5-di (2-ethylhexanoylperoxy) hexane, di-t-butyl diperoxyphthalate, 0,0-t-butyl hydrogen monoperoxymaleate, n-butyl 4,4-bis (t-butylperoxy) valerate, 2,5-dimethyl-2,5 bis (t-butylperoxy) hexane, bis-(p-bromobenzoyl) peroxide.

The thermosetting urethanes are prepared by reacting (1) a diisocyanate such as hexamethylene diisocyanate, diphenyl methane p,p'-diisocyanate, dichlorodiphenyl methane diisocyanate, dimethyl diphenyl methane diisocyanate, diphenyl dimethyl methane diisocyanate, 4,4'-dibenzyl diisocyanate, diphenyl ether diisocyanate, 3,3'-dichlorodiphenyl-4,4'-diisocyanate, naphthylene-1,5-diisocyanate, tetramethylene diisocyanate, thiodipropyl diisocyanate, p-phenylene diisocyanate, 2,4-toluene diisocyanate, 2,6-toluene diisocyanate, tetrachloro p-phenylene diisocyanate, tetrachloro-m-phenylene diisocyanate, dianisidine diisocyanate, benzidine diisocyanate, 3,3'-benzidine diisocyanate, durene dissocyanate and bitolyene dissocyanate with (2) a long chain dihydric alcohol such as polyeteramethylene glycol molecular weight 4000 or polypropylene clycol molecular weight 2025 or 4000 or 10,000 or polyethylene glycol molecular weight 4000 or 10,000 or with an essentially linear polyester made by reacting a glycol, e.g., a glycol containing 2 to 10 carbon atoms such as butanediol 1,4,hexamethylene diol-1,6, octamethylene diol-1,8, decamethylene diol-1,10, ethylene glycol, trimethylene glycol, propylene glycol, quinitol, hexahydropyrocatechol, 1,3-butene glycol, thiodiglycol, diethylene glycol, dipropylene glycol, 2-methyl-1,3-propanediol, 2-propyl-1,4-butanediol, 2-methyl-1,5-pentane diol, neopentyl glycol, 2-methyl-1,5-pentanediol, with a dicarboxylic acid such as adipic acid, succinic acid, pimelic acid, suberic acid, azelaic acid, sebacic acid, malonic acid, methyl adipic acid, maleic acid, dihydromuconic acid, thiodipropionic acid, phthalic acid, isophthalic acid, terephthalic acid and hexahydrophthalic acid. As a curing agent there may be used a diamine such as 4,4'-methylene bis(2-chloroaniline) or other conventional diamine curing agents for the above diisocyanates.

Any of the conventional pigments can be employed in the polymer compositions such as titanium dioxide, ferric oxide, calcium oxide, zinc oxide, ochre, litharge, white lead, clays, e.g., kaolin and china clay, calcium carbonate, silica, talc, asbestos, diatomaceous earth, basic lead carbonate, whiting lithopone, zinc sulfide, antimony trioxide, barium sulfate, red lead, Spanish oxide, burnt sienna, red iron oxide, Venetian red, cadmium red, cadmium sulfoselenide, cadmium-mercury sulfide, raw umber, burnt umber, sienna, hydrated yellow iron oxide, chrome yellow, chrome orange, molybdenum orange, zinc chromate, basic zinc chromate, cadmium yellow, chrome green, chromium oxide green, iron blue, ultramarine, blue basic lead sulfate, carbon black, precipitated black iron oxide and metallic pigments, e.g., aluminum powder.

Fillers are optionally included in the polymer composition. Examples of conventional fillers are cork fines, calcium carbonate, Fuller's earth and talc. Other operative fillers are inorganic materials such as mica, clay, fibrous magnesium silicate, zeolites, glass fibers, carbon black, powdered charcoal, $SiO_2$ and diatomaceous earth, and organic materials, such as wood flour, lignin, lignin sulfonates, paper pulp, regenerated cellulose, finely ground straw, finely divided barks, such as Douglas fir bark or any fraction thereof, especially the cork fraction, shell, flours, e.g., walnut shell flour and other vegetable matter.

The invention is further illustrated by the following examples in which all parts and percentages are by weight unless otherwise specified.

EXAMPLE 1

An injection molded 5 gallon polyethylene can with a gasketed cover was placed between the mold supports of the apparatus shown in the FIGURE. 1000 g Adiprene L-167, a polyurethane prepolymer made by du Pont, was heated to 60° C., 195 c of methylene di (orthochloro aniline) was melted at 110° C., and was mixed with the Adiprene, giving a mix temperature of 70° C. The liquid mixture was poured into the polyethylene can which was used as a mold, and the cover was clamped on place. The outer frame was rotated at 3.0 rpm and the inner frame at 4.05 rpm. After 4 hours, the rotation was stopped and the molded piece, having the shape of the inside of the five gallon can and a uniform wall thickness of about ⅛ inch, was removed from the can.

EXAMPLES 2–37

Similar experiments were conducted in the same apparatus as described above. The following table summarizes the results of these experiments, not all of which produce acceptable articles, as explained below. In examples 2–26, a five gallon can was used, as above, and in examples 27–37, a 55 gallon polyethylene drum was used as the mold. Where the term "mold heating" appears, the mold was heated from the outside by a heating mantle or heat lamps and in all cases to a temperature less than 100° C. Heating was used as an optional expedient to hasten curing of the polymer system.

| Example | Polymer System | Mold Size | Mix Temp. | Mold Heating | Speed-rpm Outer Frame | Speed-rpm Inner Frame | Time | Results |
|---|---|---|---|---|---|---|---|---|
| 2. | 1000 g L167, 195 g MOCA | 5 gal. | 70° C. | yes | 2.8 | 0.67 | 2 hrs. | gap in molded piece, poor uniformity. |
| 3. | 1000 g L167, 195 g MOCA | 5 gal. | 70° C. | yes | 2.8 | 0.67 | 2 hrs. | gap in molded piece, poor uniformity. |
| 4. | Same | Same | 66° C. | yes | 3.0 | 4.3 | 2¼ hrs. | Uniform wall thickness |
| 5. | Same | Same | 75° C. | no | 2.8 | 0.67 | 12 hrs. | 2 gaps |
| 6. | Same | Same | 68° C. | no | 3.0 | 1.09 | 1½ hrs. | 2 gaps |
| 7. | Same | Same | Same | no | 3.0 | 1.46 | 3½ hrs. | no gaps, uniform wall thickness |
| 8. | Same | Same | 66° C. | no | 3.0 | 1.25 | 4 hrs. | 2 gaps |
| 9. | Same | Same | Same | no | 3.0 | 2.6 | 2½ hrs. | no gaps |
| 10. | 500 g L-167, 500 g L-315, 230 g MOCA | Same | Same | no | 3.0 | 4.3 | 2 hrs. | no gaps, uniform wall thickness |
| 11. | Same | Same | 64° C. | no | 4.0 | 5.5 | 2 hrs. | 2 gaps |
| 12. | 658 g L-167, 280 g Epon 828, 262 g MOCA | Same | 100° C. | yes | 2.99 | 4.28 | 20 hrs. | no gaps, uniform wall thickness |
| 13. | 329 g L-167, 329 g L-315, 281 g Epon 828, 261 g MOCA | Same | 65° C. | yes | 2.94 | 4.4 | 18½ hrs. | one gap & 2 thick areas |
| 14. | Same | Same | Same | Same | Same | 3.49 | 20 hrs. | no gaps, uniform wall thickness |
| 15. | 1000 g L-315, 271 g MOCA | Same | 40° C. | Same | Same | 4.4 | 4 hrs. | 2 gaps |
| 16. | Same | Same | 60° C. | Same | Same | 3.49 | 3 hrs. | non uniform wall thickness |
| 17. | Same | Same | Same | Same | Same | 6 | 1 hr. | Same, large gap |
| 18. | Same | Same | Same | Same | Same | 4.4 | Same | Same |
| 19. | Same | Same | Same | Same | Same | 1.61 | Same | Same |
| 20. | 329 g L-167, 329 g L-315 261 g MOCA, 281 g Epon 828 | Same | Same | Same | 2.91 | 3.85 | 1 hr. | uniform wall thickness, no gaps |
| 21. | 1000 g L-315, 27 g MOCA, 85.5 g TMP | Same | 70° C. | Same | Same | Same | 5 hr. | uniform wall thickness, no gaps |
| 22. | 667 g Rucoflex S 1017-115, 92.2 g TMP, 462 g HMDI | Same | 106° F. | Same | 3.0 | 4.05 | 6½ hr. | Same |
| 23. | 415 g Niax D 520, 67 g TMP, 335 g HMDI, 5.0 g Dabco, 5.0 g T-9 | Same | RT | Same | Same | Same | ½ hr. | Same |
| 24. | 544 g Rucoflex 1014-110, 67 g TMP, 335 g HMDI | Same | Same | Same | Same | Same | ¾ hr. | no gaps, fairly uniform wall thickness |
| 25. | 423 g Rucoflex 1014-110, 52 g TMP, 59 g Butanediol, 423 g HMDI, 4 g Dabco, 4 g T-9 | Same | Same | Same | Same | Same | 1 hr. | no gaps, fairly uniform wall thickness |
| 26. | 544 g Rucoflex 1014-110, 76 g Butanediol, 45 g TMP, 468 g MDI | Same | Same | Same | Same | Same | Same | no gaps, poor wall thickness uniformity precoated mold with 0.1 g Sn Oct 50 cc hexane |
| 27. | 5250 g L-167, 1050 g MOCA | 55 gal. | 70° C. | no | 3 | 3 | 2 hrs. | no distribution of polymer |
| 28. | 5570 g L-167, 1103 g MOCA | Same | Same | yes | 3.1 | 4.4 | Same | 3 gaps |
| 29. | 11.6 lb. L-167, 2.26 lb. MOCA | Same | Same | Same | 1.26 | 1.56 | 18 hrs. | no gaps, uniform wall thickness |
| 30. | Same | Same | Same | Same | 2.0 | 1.2 | Same | 2 small gaps |
| 31. | Same | Same | Same | Same | 4.0 | 13.3 | Same | 3 large gaps |
| 32. | Same | Same | Same | Same | 1.49 | 5.00 | Same | 3 gaps |
| 33. | Same | Same | Same | Same | 1.48 | 2.45 | Same | 3 gaps |
| 34. | Same | Same | Same | no | Same | Same | 3 hr. | Same |
| 35. | 5280 g L-315, 142 g MOCA, 451 g TMP, 0.5 g T-9 | Same | 50° C. | yes | 1.26 | 1.50 | 3 days | no gaps, uniform wall |

-continued

| Example | Polymer System | Mold Size | Mix Temp. | Mold Heating | Speed-rpm Outer Frame | Speed-rpm Inner Frame | Time | Results |
|---|---|---|---|---|---|---|---|---|
| 36. | 5280 g L-315, 423 g 3M glass microballoons, 142.5 g MOCA, 451.4 g TMP | Same | 60° C. | Same | | | Same | no gaps, uniform wall thickness |
| 37. | 2640 g L-315, 740 g 3M glass microballoons, 660 g hexane, 71 g MOCA, 226 g TMP | Same | Same | Same | 1.26 | 1.50 | 3 days | several large gaps |

In the preceding, L-167 and L-315 refer to Adiprene polyurethane prepolymers, manufactured by du Pont. MOCA is methylene di (orthochloro aniline). Epon 828 is a bisphenol-A epoxy resin manufactured by Shell. TMP is trimethylol propane. HMDI is hydrogenated diphenyl methane diisocyanate. T-9 is stabilized Stannous Octoate, manufactured by M & T Chemicals. Dabco is diazobicyclooctane. Rucoflex-S 1017-110 is a mixed-ethylene-propylene glycol adipate having a hydroxyl number of 110. Rucoflex 1014-110 is a butane diol adipate-phthalate, having a hydroxyl number of 110. Both are manufactured by Hooker Chemical Company.

The above table demonstrates the difference in molding conditions for the various types of polymer systems and molds used. Examples 1, 4, 7, 9, 10, 12, 14, 20–26, 29, 35 and 36 were successful runs where the molded item had walls of uniform thickness with no gaps in the walls and represented many different polymer systems and mold sizes. Examples 15–19 and 39 had gaps in the walls of the molded pieces due to incorrect properties of the liquid polymer systems, such as, the previously mentioned initial viscosity, distribution or fast gel time. They were run under conditions which duplicated those of successful runs, but used different polymer systems. Examples 2, 3, 5, 6, 8, 11, 13, 27, 28, and 30–34 had gaps in the walls of the molded pieces due to improper rotation rates. The gaps are due to the improper spreading, distribution, or maintaining of rotation and can be avoided by varying the rotational speeds and/or relationship of the axes. For example, merely installing transparent windows in the mold and observing the thickness of the resin provides simple means to monitor the distribution of resin. Inasmuch as the centrifugal force is very small, the gravitational distribution is controlled by the above means and mere observation provides the necessary adjustment. Generally a one shot molding can build up the article up to a maximum of ¼ inch, but additional injection(s) (after the first) may build up the article to any desired thickness by the same method.

There are successful runs using the same molds and polymer systems listed in the first group. They differ from the group only in rotation speeds. In summary, the particular polymer system, mold size and configuration and rotational speed of each axis are all relevant factors for controlling distribution, maintaining the distribution during the viscosity changes until the gel stage for the resin, such that the successful molding of an acceptable article can readily be determined by a minimum of experimentation or observation.

EXAMPLE 38

The polyurethane prepolymer Adiprene L 100, based on tetramethylene glycol having a toluene-2,4-diioscyanate (mol. wt. 1,000) of 4.1% is mixed with MOCA [4,4'-methylene bis(2-chloroaniline)] which had been melted at a temperature above 220° F. in a ratio of 25 grams of the prepolymer to 2 grams of MOCA. The resulting mixture was immediately placed in an aluminum mold of a ball having a 10 inch diameter and the mold maintained at ambient temperature (65° F.) and rotated for 25 minutes about two virtually perpendicular axes. The rigid piece was then removed from the mold and found to have a smooth surface and a uniformly thin wall.

EXAMPLE 39

The process of Example 38 was repeated except that 27 grams of the polymer composition was placed in a polyester-fiberglass mold of a ball having a 10 inch diameter. The mold was rotated about two axes at room temperature (65° F.) for a period of 25 minutes until the polymer composition was cured. The finished product was then removed. It resembled the produce of Example 38 in appearance and quality.

EXAMPLE 40

25 g. polyester resin "Laminac 4155*" was mixed with 0.5 g. MEK peroxide and placed in the mold described in Example 1. The mold was rotated about two axes for 20 minutes. The mold was opened and the rigid piece was removed from it. It was found to have a uniform thin skin.
* American Cyanamid

EXAMPLE 41

25 g. of epoxy resin Epon 838+ and 3.5 g. triethylene tetramine were mixed and placed in the mold described in Example 38. The mold was rotated about two axes for 30 minutes, and was then opened and the finished molded piece was removed from it.
* Shell Chemical

EXAMPLE 42

100 g. of polyester resin "Laminac 4155*" was mixed with 2 g. MEK peroxide and placed in a waxed cardboard box whose interior seams were taped closed, having the dimensions 6 inches×8 inches×12 inches. The box was rotated as above for 20 minutes. The box was then peeled off of the finished piece, which was hollow and had a box shape.
* American Cyanamid

EXAMPLE 43

Example 42 was repeated exactly except that 10 g. short chopped glass fibers were dispersed in the resins. The resulting product was stiffer and stronger than the one from Example 42.

EXAMPLE 44

A life size model of a human head was covered with a one inch layer of papier mache. After drying for 2 days, the papier mache was carefully cut away from the model. The inside of the papier mache mold was then coated with wax, and a mixture of 100 g. of Laminac 4155 and 2 g. MEK peroxide was poured into one section. The other section of the mold was joined with adhesive tape and the assembly was rotated in two dimensions for 20 minutes. The mold was then opened and a hollow plastic replica of the mold was obtained.

In addition to the above embodiments, the following additional embodiments have also been discovered. A mold is used in which the catalyst, such as any of the catalysts mentioned above, is introduced in a solution for curing the thermoset catalyst system. The catalyst may be up to 100% preferably less than 50% of the catalyst used with the thermoset resin. Reduced amounts are used when the gel time becomes unduly short. The improvements are observed in the uniformity and thickness of the molded part.

As set forth in the Table above, the temperatures may be as high as 100° C. and the mold held at constant temperature. As a consequence, forming cycle times may be shortened within the above discussed parameters of viscosity control, distribution, etc., and thus economics of the process improved.

The mold may be precoated with a paint or other coating solution which gels sufficiently and with which the subsequently introduced thermoset resin forms a good bond. Suitable paints and coating are rotated in the mold in the same manner as above or merely spray painted or sprayed, such as gel-coat (used in boat industry). Other coatings are epoxy based coatings or paints or vinyl or acrylic paints. The above steps improve the economics of a parts manufacturing process as well as the quality of the coating.

Still further, the interior of the mold may incorporate a removable reinforcing matrix deposited therein by placement of a scrim or fibers or a cellular open cell structure, e.g., reticulated polyurethane foam. Thermoset articles may thus be molded with improved strength or stiffness. It may be convenient to introduce a portion of the resin in the mold, gel or harden it to a tacky state, then lay the scrim, foam, fibers, etc., such as fiberglass in the resin, i.e., cloth or fibers from a gun as chopped fibers) and then introduce an additional portion of the resin after the first "shot" has sufficiently hardened. The objects or shapes thus formed have improved strength and stiffness and are suitable as load bearing members.

In a similar manner, composite structures with foam core are obtained (two-shot filling of mold). These structures or shapes have good surface properties, but lighter weight or greater stiffness. Suitable foams are styrene foams (Styrofoam), polyvinyl chloride foams (Airex foam), polyurethane foam, etc.

A still further embodiment is the molding of a shape which incorporates a light stable surface, e.g., a more light resistant (UV, IR, etc., radiation) polymer or additive. Thus, the first shot of the resin may be compounded with the light stabilizers and to build up the necessary thickness, a less costly or non-supplemented thermoset resin may be used. The light stabilizers are well known in the art and need not be listed here for understanding of the invention.

In a similar manner, a mold release agent (such as silicone based mold release agents) may be introduced in the mold and by rotation distributed over the interior mold surfaces. Operating efficiencies may thus be improved.

When practicing the above invention, slight variations of dimensions (from the same mold) of a molded shape have been obtained when a volatile diluent is introduced with the resin. It appears that controlled shrinkage is achieved and removal of shape from the mold is improved. Generally, the shrinkage is less than 1% of the largest mold dimension.

Although rotation as disclosed herein is in two axes, and can be achieved by adding an additional axis, from the practical standpoint two axes are sufficient for practicing the present invention.

For certain product configuration, rotation in one axis may be adequate to produce a desired shape solely under the influence of gravitational force.

I claim:

1. A process for low rotational velocity molding at ambient temperatures or up to 100° C. of an object or shape comprising:
   (a) mixing a liquid thermosetting polymer or a liquid prepolymer with a curing agent capable of hardening the thermosetting polymer or prepolymer at ambient temperature to form a thermosetting polymer system, and a reinforcing agent such as fiberglass and placing the resulting liquid polymer system with reinforcing agent into a mold, in combination with
   (b) moving said mold, said moving consisting of rotating said mold about two axes at such low rotational velocity, at ambient temperatures such that the centrifugal force on said mixture is negligible and adjusting the rotational velocity about each axis such that, upon observation, a uniform distribution of said polymer is obtained thereby causing the polymer system to be distributed uniformly over and to coat the walls of the mold taking the form thereof, and continuing the rotation until the liquid polymer system hardens, and
   (c) removing a solid shape thus produced from the mold.

2. The process as defined in claim 1 and wherein the polymer system with a reinforcing member is placed in said mold at least one additional time and steps (b) and (c) repeated.

3. The process as defined in claim 1 wherein a reinforcing member is placed in the mold after the first placing of the polymer system without reinforcing member in the mold and a predetermined amount of said polymer is placed in said mold at least one additional time and steps (b) and (c) repeated.

4. The process as defined in claim 1 wherein the polymer system is a polyester polymer system.

5. The process as defined in claim 1 wherein the polymer system is a polyepoxy polymer system.

6. The process as defined in claim 1 wherein the polymer system is a polyurethane system.

* * * * *